(12) United States Patent
Schisler et al.

(10) Patent No.: US 8,408,232 B2
(45) Date of Patent: Apr. 2, 2013

(54) SEQUENCE VALVE

(75) Inventors: Eric Ray Schisler, Saint Charles, IL (US); J. Eric Haggard, South Elgin, IL (US)

(73) Assignee: Parker Hannifin Corporation, Cleveland, OH (US)

( * ) Notice: Subject to any disclaimer, the term of this patent is extended or adjusted under 35 U.S.C. 154(b) by 588 days.

(21) Appl. No.: 12/580,301

(22) Filed: Oct. 16, 2009

(65) Prior Publication Data

US 2011/0067767 A1  Mar. 24, 2011

Related U.S. Application Data

(60) Provisional application No. 61/244,940, filed on Sep. 23, 2009.

(51) Int. Cl.
 G05D 7/00 (2006.01)

(52) U.S. Cl. .............. 137/102; 137/625.68; 137/596.18; 60/413; 60/452; 417/213

(58) Field of Classification Search .................. 137/102, 137/625.25, 625.66, 625.68, 625.69, 596.18, 137/596.2; 60/413, 418, 452; 417/23, 36, 417/213
 See application file for complete search history.

(56) References Cited

U.S. PATENT DOCUMENTS

| | | | | |
|---|---|---|---|---|
| RE23,682 | E | * | 7/1953 | Stevenson ................ 137/115.19 |
| 3,074,382 | A | * | 1/1963 | Alfieri ............................. 91/433 |
| 3,451,415 | A | * | 6/1969 | Buford et al. ................. 137/102 |
| 3,570,519 | A | * | 3/1971 | Bianchetta .................... 137/101 |
| 3,625,246 | A | * | 12/1971 | Reaves .......................... 137/408 |
| 3,802,453 | A | * | 4/1974 | Fleury ............................. 137/85 |
| 3,832,095 | A | * | 8/1974 | Akima et al. .................. 417/307 |
| 3,991,570 | A | * | 11/1976 | Keller ............................. 60/413 |
| 3,995,529 | A | | 12/1976 | Bach et al. |
| 4,040,437 | A | * | 8/1977 | Gottling ......................... 137/102 |
| 4,091,832 | A | * | 5/1978 | Snyder et al. ................... 137/72 |
| 4,114,637 | A | * | 9/1978 | Johnson ..................... 137/115.21 |
| 4,164,342 | A | | 8/1979 | Johnson |
| 4,199,941 | A | | 4/1980 | Farr |
| 4,320,622 | A | | 3/1982 | Farr |
| 4,420,011 | A | * | 12/1983 | Roger ............................ 137/269 |
| 4,465,090 | A | * | 8/1984 | Morgan et al. ................ 137/102 |
| 4,510,962 | A | * | 4/1985 | Mott et al. ..................... 137/102 |
| 4,615,353 | A | * | 10/1986 | McKee .......................... 137/102 |
| 4,635,671 | A | * | 1/1987 | Viegas .......................... 137/102 |
| 4,665,697 | A | * | 5/1987 | Dantlgraber ................... 60/418 |

(Continued)

OTHER PUBLICATIONS

Eaton Vickers, Screw-In Cartridge Valves V-VLOV-MC001-E-4, Pilot Unloading Valve PUV3-10, pp. E-74 and E-75, Sep. 2007.
Hydraforce.com, Pressure Controls, UP10-31 Unloading Pilot Internal Drain, 16.903.1 and 16.903.2.
Hydraforce.com, Pressure Controls, Up 10-30 Unloading Pilot Internal Drain, 6.902.1 and 6.902.2.

(Continued)

*Primary Examiner* — John Rivell
*Assistant Examiner* — Minh Le
(74) *Attorney, Agent, or Firm* — Renner, Otto, Boisselle & Sklar, LLP

(57) ABSTRACT

A sequence valve for a hydraulic circuit provides a control signal through a control signal port to a pressure responsive flow source to maintain pressure in an accumulator between a low pressure setting and a high pressure setting. The valve includes accumulator, flow source and drain ports, in addition to the control signal port. A spool controls communication between the control signal port and the drain port. A piston is moved by pressure in the accumulator port against a control spring to close communication between the control signal port and the flow source port, and to move the valve spool to close communication between control signal port and the drain port. A differential between the net cross sectional area of the spool establishes the differential between the high and low pressure settings of the accumulator.

27 Claims, 8 Drawing Sheets

U.S. PATENT DOCUMENTS

| | | | |
|---|---|---|---|
| 4,699,571 A * | 10/1987 | Bartholomaus | 417/213 |
| 4,727,793 A | 3/1988 | Hall | |
| 5,513,958 A * | 5/1996 | Mientus | 417/213 |
| 5,615,705 A * | 4/1997 | Cho | 137/596.2 |
| 5,694,965 A * | 12/1997 | Roulet | 137/102 |
| 5,775,359 A * | 7/1998 | Mies | 137/102 |
| 6,439,257 B1 * | 8/2002 | Bruck et al. | 137/102 |
| 7,686,039 B2 * | 3/2010 | Tabor | 137/625.66 |
| 2003/0131884 A1 * | 7/2003 | Hope et al. | 137/102 |
| 2006/0159561 A1 * | 7/2006 | Tessien | 417/313 |
| 2008/0078286 A1 * | 4/2008 | Gray | 91/461 |
| 2008/0080985 A1 * | 4/2008 | Gray et al. | 417/222.1 |
| 2008/0216471 A1 * | 9/2008 | Staudinger et al. | 60/418 |
| 2010/0084031 A1 * | 4/2010 | Hunnicutt | 137/625.66 |

OTHER PUBLICATIONS

Parker Hannifin Corporation, Threaded Cartridge Valves and Integrated Hydraulic Products, Catalog HY15-3500/US, Lincolnshire, IL US, pp. SP11 and SP12, Copyright 2003.

MICO Product Bulletin, Load Sensing Accumulator Charging Valve with Load Sense Bleed, Rev. 2005, Form No. 80-463-012.

Sterling Hydraulics, Unloading Relief Valve, pp. 398 and 399.

Integrated Hydraulics, Product Bulletin Pilot Operated-Sliding Spool Type, Mentor OH USA pp. 12-111.D and 12-111. H.

Parker Hannifin Corporation, Hydraulic Cartridge Systems, Technical Information, Differential Area Unloading Relief Valve, Series RU101, Catalog HY-15/3051-US, pp. PC49 and PC-50.

* cited by examiner

SEQUENCE VALVE

CROSS REFERENCE TO RELATED APPLICATIONS

The present application claims the benefit of the filing date of U.S. Provisional Patent Application Ser. No. 61/244,940, filed Sep. 23, 2009, the disclosure of which is incorporated herein by reference in its entirety.

TECHNICAL FIELD

The present invention relates to a sequence valve for use in a hydraulic circuit having a pressure responsive flow source. The sequence valve provides a control signal to the pressure responsive flow source to control the output of the source.

BACKGROUND OF THE INVENTION

Hydraulic circuits may include a pressure responsive flow source for powering a hydraulic load. The load may include an accumulator for storing energy.

The pressure responsive flow source may be any variable output flow source whose output is controlled by a pressure signal. Examples include but are not limited to variable displacement pumps and fixed displacement pumps with valves to increase and decrease flow from the fixed displacement pump.

The accumulator may be any device that stores energy in the form of fluid pressure. Examples include but are not limited to bladder type accumulators that store fluid under pressure in an expandable elastomeric chamber and piston type accumulators that store fluid under pressure in a cylinder that includes a piston acting against the fluid.

The accumulator may operate between a lower pressure setting and a higher pressure setting. When the accumulator is at its lower pressure setting, it is desirable to provide a signal to the pressure responsive flow source to increase fluid flow to recharge the accumulator. When the accumulator reaches its upper pressure setting, it is desirable to provide a signal to the pressure responsive flow source to decrease fluid flow to the accumulator. It is common to use an unloader valve that is responsive to accumulator pressure to supply a control signal to a load sensing device, such as a pump or valve, for controlling the supply of fluid to the accumulator.

SUMMARY OF THE INVENTION

The present invention provides a sequence valve that receives a fluid pressure signal from an accumulator or other load and provides a fluid pressure control signal to a pressure responsive flow source. The invention also provides a hydraulic circuit that includes such a sequence valve.

More specifically, the sequence valve provides a variable fluid pressure control signal to a pressure responsive flow source to load the pressure responsive flow source when the load requires increased flow and to unload the pressure responsive flow source when the load requires decreased flow. For example, the sequence valve may provide a control signal to load the pressure responsive flow source when an accumulator is to be charged and may provide a control signal to unload the pressure responsive flow source when the accumulator is fully charged.

Still more specifically, the sequence valve includes a valve spool and an actuator piston, each independently slidable in a bore. The valve spool is moved by a spring, by the fluid pressure control signal, and by the piston. The piston is moved by accumulator pressure and by the fluid pressure control signal. The spool controls communication between a fluid pressure control signal port and a drain port, and the piston moves the spool in a direction to open such communication when the accumulator pressure reaches its higher set pressure and the accumulator is fully charged. The piston controls communication between a flow source port and the fluid pressure control signal port, to close such communication when the accumulator reaches its higher set pressure and the accumulator is fully charged.

Still further, the invention provides a sequence valve in which an orifice is disposed between the flow source port and the fluid pressure control signal port, to reduce fluid pressure from the flow source port to the control signal port when fluid is flowing therebetween. The invention also provides a differential between the net cross sectional area of the spool exposed to control signal pressure and the net cross sectional area of the piston exposed to such control signal pressure, to establish the differential between the high pressure setting and low pressure setting of the accumulator or other load in the circuit.

Further, the invention provides various ones of the features and structures described in the claims set out below, alone and in combination, which claims are incorporated by reference in this summary of the invention.

BRIEF DESCRIPTION OF THE DRAWINGS

Embodiments of this invention will now be described in further detail with reference to the accompanying drawings, in which.

DETAILED DESCRIPTION OF THE INVENTION

The principles, embodiments and operation of the present invention are shown in the accompanying drawings and described in detail herein. These drawings and this description are not to be construed as being limited to the particular illustrative forms of the invention disclosed. It will thus become apparent to those skilled in the art that various modifications of the embodiments herein can be made without departing from the spirit or scope of the invention.

Figure 1:
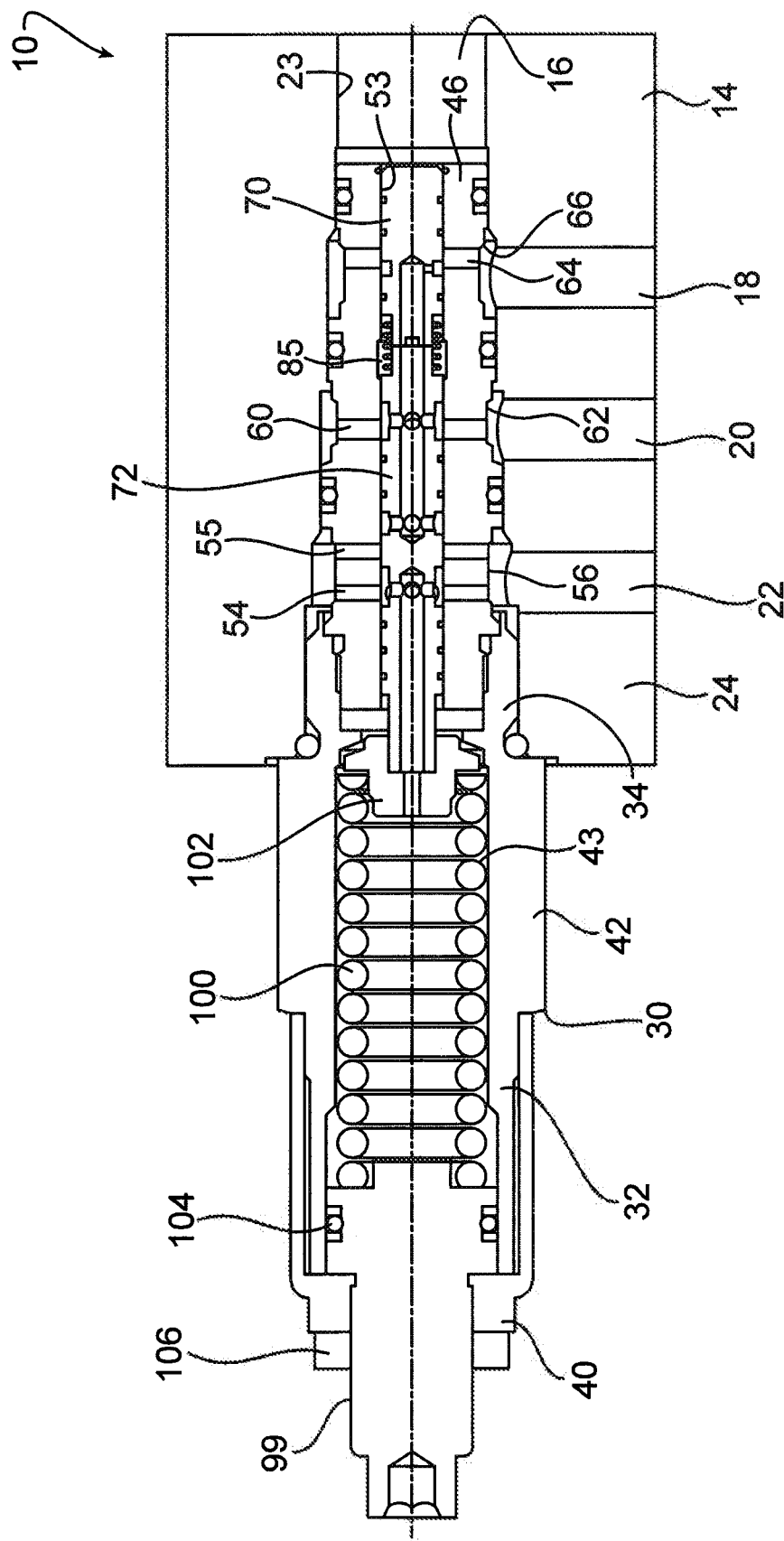
FIG. 1 is a cross sectional side elevation view of a presently preferred embodiment of a sequence valve according to certain principles of the invention.

A first embodiment of the present invention is shown in FIGS. 1-7. Referring first to FIG. 1, a sequence valve 10 is disposed in a cavity block 14. The sequence valve 10 is carried by the cavity block 14 and is the type of valve that is generically called a cartridge valve. The cavity block 14 is of machined steel and may include other cartridge valves or other hydraulic or pneumatic or other components disposed in other cavities (not shown) in the cavity block 14 in a well known manner. The cavity block 14 includes an accumulator port 16, a supply or fluid flow port 18, a control signal port 20, and a tank port 22. The cavity block 14 also includes a central cavity 23 having a threaded end portion 24 for threadably receiving the sequence valve 10.

The sequence valve 10 includes a generally tubular machined steel adjustment spring body 30 that has threaded first and second ends 32 and 34. An adjustment cap 40 is threaded onto the first end 32, and the second end 34 is threadably received within the end portion 24 of the cavity 23. The adjustment spring body 30 also includes a central portion 42 intermediate the threaded ends 32 and 34. The central portion 42 abuts the end face of the cavity block 14, and a suitable O-ring seal prevents fluid leakage between the body 30 and the cavity block 14. The body 30 also includes an axially extending passage 43 that extends from end to end through the body 30.

Still referring to FIG. 1, a cage or cartridge or housing 46 of the sequence valve 10 is threadably connected to the end 34 of the adjustment spring body 30 and is fixedly held by the body 30 in the central cavity 23 of the cavity block 14. The housing 46 is of machined steel and is a generally tubular configuration. An axial passage 53 extends from end to end through the housing 46. First and second tank ports or 54 and 55 extend radially from the axial passage 53 and are in fluid communication with the tank port 22 in the cavity block 14 under all conditions. The first tank passage 54 is open to the tank port 22 under all conditions, so that the adjustment spring body 30 is exposed to tank or drain pressure under all conditions. The second tank passage 55 is alternately open to and closed from the tank port 22 during operation of the sequence valve 10, as discussed further below. A control signal port or passage 60 extends radially from the axial passage 53 and is in fluid communication with the control signal port 20 under all conditions. A supply or flow source port or passage 64 extends radially from the passage 53 and is in fluid communication with the supply or flow source port 18 under all conditions.

The passages or ports 54, 55, 60 and 64 open outwardly to exterior circumferential grooves 56, 62 and 66 on the outer surface of the housing 46, and the exterior grooves are separated by lands. An additional land is provided between the groove 66 and the port 16. The lands each include a circumferential seal groove that carries a stationary seal assembly. In the preferred embodiment shown in FIGS. 1-7, each seal assembly includes an O-ring seals and a generally flat planar back up ring on each side of the O-ring. Other suitable seal configurations could alternatively be used.

Figure 3:
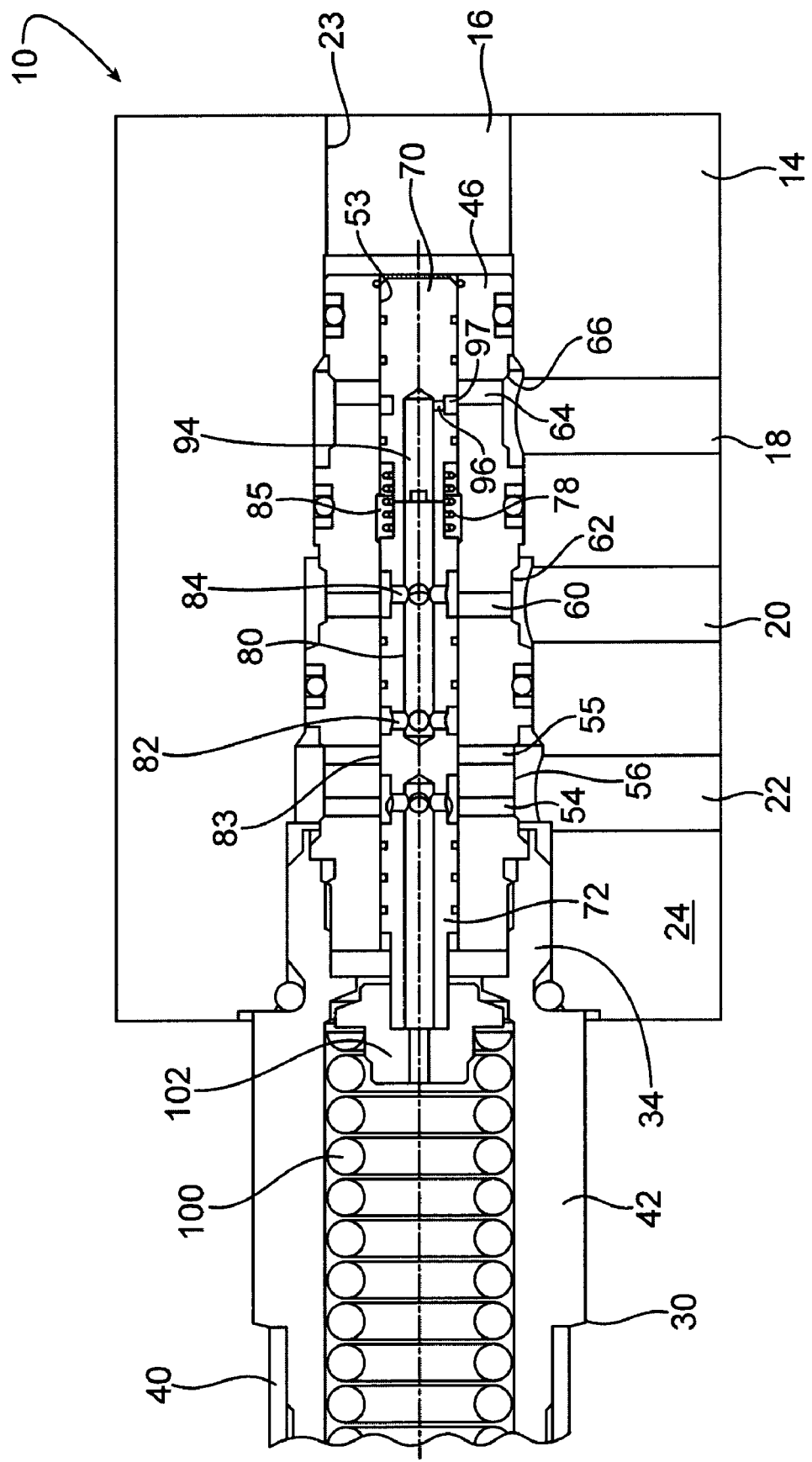
FIG. 3 is a cross sectional side elevation view of a portion of the sequence valve shown in the FIG. 2 circuit, in a first operating position of the sequence valve at the start of a sequence to charge the accumulator.

Referring now to FIG. 3, the components of the sequence valve 10 are shown in larger size and with the left end of the adjustment spring body 30 eliminated to permit other portions of the sequence valve 10 to be enlarged. As shown in FIG. 3, the sequence valve 10 further includes a piston 70 and a spool 72. The piston 70 and spool 72 are separately slidably received in the central passage 53 of the housing 46. As described further below, the piston 70 and the spool 72 and are each arranged to move together under certain conditions and to move relative to one another under other conditions, to cooperatively control the fluid pressure in the control signal ports 60 and 20.

Referring still to FIG. 3, the right end of the spool 72 includes a reduced diameter portion that receives a helical spring 78. The spring 78 is a small spring with a light force, and it is provided to help maintain the relative positions and space between the piston 70 and spool 72 as discussed further below. The spool 72 also includes a first axial passage 80. The first axial passage 80 extends from the right end of the spool 72 and is intersected by radial passages 84 that extend radially outward from the passage 80 to a circumferential groove in the exterior of the spool 72. The passages 84 are configured so that they are in open fluid pressure communication with the control signal ports 20 and 60 under all conditions. The first axial passage 80 terminates just beyond other radial passages 82 that extend radially outward from the passage 80 to another circumferential groove on the exterior surface of the spool 72. As discussed further below, the other radial passages 82 are alternately closed from and open to the tank ports 55 and 22 by a land 83 as the sequence valve operates, to reduce under certain operating conditions the fluid pressure in the control signal ports 20 and 60. This structure provides open fluid pressure communication under all operating conditions between the control signal ports 20 and 60, the radial passages 84, the axial passage 80, the radial passages 82, and a chamber 85 that is disposed between the opposing end faces of the spool 72 and piston 70 (that is, the right end face of the spool 72 and the left end face of the piston 70). As also discussed further below, the passage 53 in the cage 46 is a stepped passage, and the spool 72 is slightly smaller in diameter than the piston 72. This difference in diameters, and the resulting difference in the net lateral cross sectional areas of the spool 70 and piston 72 exposed to the pressure of the control signal ports 20 and 60 in the chamber 85, provides the difference between the high pressure set point and the low pressure set point for the pressure responsive flow source described further below.

The piston 70 includes a smaller diameter portion at its left end, to receive the helical spring 78 in the same manner as the spring 78 is received on the right end of the spool 72. The right end of the piston 70 is exposed to pressure in the accumulator port 16 and is constrained against movement to the right beyond the position shown in FIG. 4 by a C-clip at the right end of the passage 53 in which the piston 70 is slidably disposed.

As further shown in FIG. 3, an axial passage 94 extends into the piston 70 from its left end. The left end face of the piston 70 also includes a cross notch that communicates the pressure in the axial passage 94 to the chamber 85 under all conditions. The fluid pressure in the axial passage 94 and the chamber 85 and the passages 80 and 84 and the control signal ports 20 and 60 are the same under all conditions. The axial passage 94 extends to a radial orifice 96, and the radial orifice 96 extends radially outward from the passage 94 to a circumferential groove 97 in the exterior surface of the piston 70. The radial orifice 96 reduces the pressure from the groove 97 to the axial passage 94 and to the chamber 85 and spool passages 80 and 84 and control signal ports 20 and 60 when fluid is flowing through the orifice 96 from the flow source ports 64 and 18. A land on the left side of the groove 97 isolates the pressure in the groove 97 from the pressure in the chamber 85, and a land on the right side of the groove 97 isolates the pressure in the groove 97 from the pressure in the accumulator port 16. The spring 78 acts between the spool 72 and the piston 70, to apply a light force to bias the spool 72 and the piston 70 apart.

Referring to FIGS. 1 and 3 together, the sequence valve 10 also includes an adjustable biasing mechanism 99. The biasing mechanism 99 includes a helical compression spring 100, a spring retainer 102, a spring load adjustment screw 104, a lock nut 106, and the cap 40. The spring 100 is disposed between the spring retainer 102 and the adjustment screw 104. The spring retainer 102 engages the left end of the spool 72 and provides a strong force to bias the spool 72 to the right as viewed in FIGS. 1 and 4 and to resist movement of the spool 72 in a direction outward of the cage 46. The adjustment cap 40 is threadably connected to the body 30 and includes interior threads for connection to the spring load adjustment screw 104. The axial position of the spring load adjustment screw 104 relative to the cap 40 may be changed by rotating the adjustment screw 104 in either direction to move the adjustment screw into or out of the cap 40 and increase or decrease the load on the spring 100. A tool receiving opening 108 receives a conventional tool to rotate the adjustment screw 104, and the lock nut 106 locks the spring load adjustment screw 104 in its selected position relative to the cap 40. The load or force of the spring 100 acting against the spool 72, and through the spool 72 to the piston 70, determines the high pressure set point of the sequence valve 10, as further discussed below.

Figure 2:
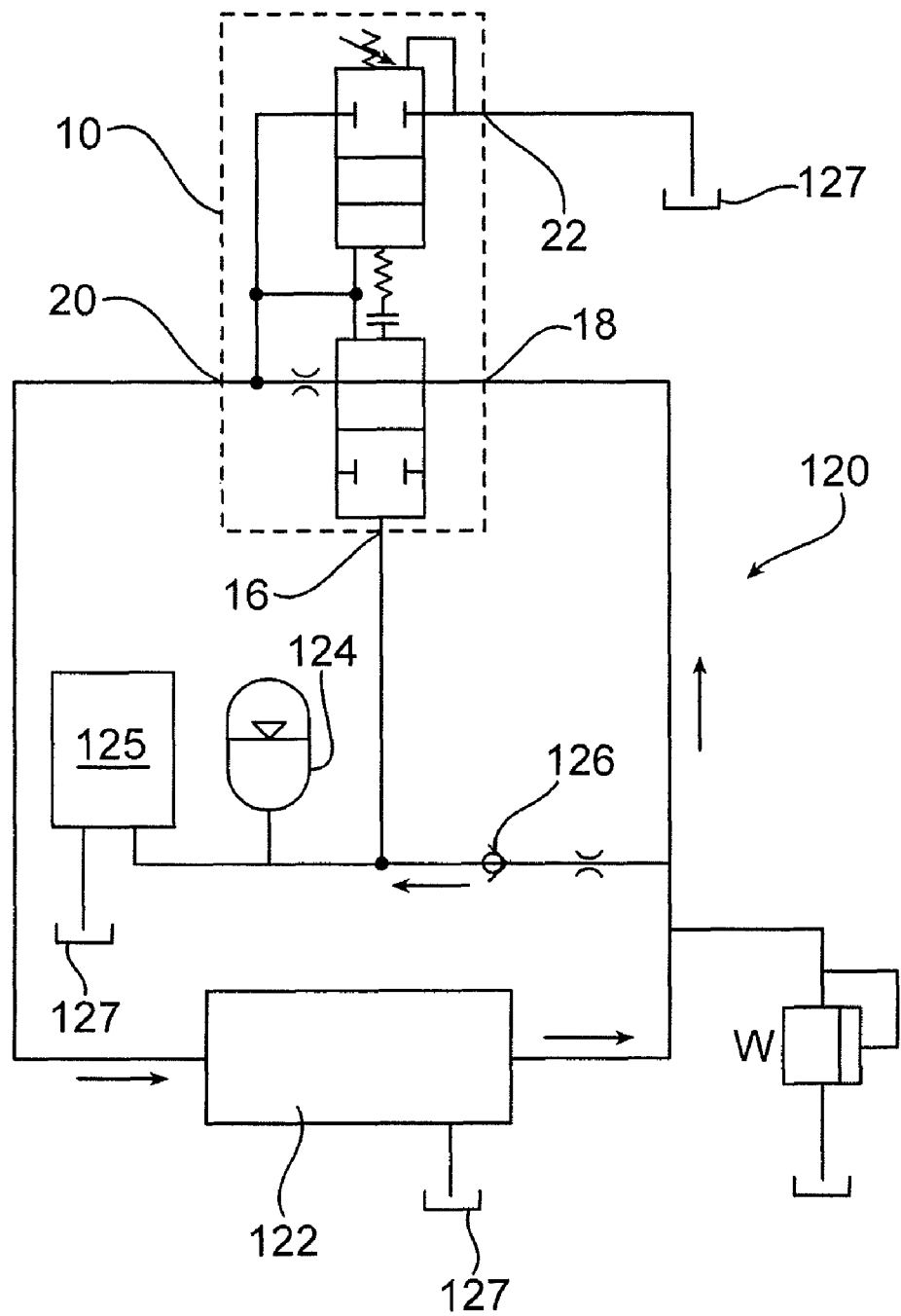
FIG. 2 is a schematic diagram showing the sequence valve of FIG. 1 in a hydraulic circuit with an accumulator and a pressure responsive flow source.

Referring now to FIG. 2, a hydraulic circuit 120 is shown in which the sequence valve 10 is used. The hydraulic circuit 120 includes a pressure responsive flow source 122. The flow source 122 has a relatively lower preset bias output pressure when it does not receive a high pressure control signal from the sequence valve 10. The flow source 122 moves to a relatively higher output pressure when it does receive a high pressure control signal from the sequence valve 10. In the preferred embodiment, the flow source 122 is a fixed displacement pump in combination with a logic valve. The flow from the fixed displacement pump flows to the logic valve, and the logic valve receives a control signal from the sequence valve 10 to provide more flow or less flow to the hydraulic circuit from the pressure responsive flow source 122 and to return unneeded flow to a return tank. In this type of flow source, the logic valve may be Parker Hannifin Corporation logic valve no R04ES-15.0. Any of numerous other well known pressure responsive flow sources may alternatively be used, such as other fixed displacement pump and valve combinations or pressure responsive variable displacement pumps or flow sources that branch from or to other circuits. In any case, the output of the pressure responsive flow source to the load in the circuit 120 is responsive to or controlled by a control signal from the control signal ports 60 and 20 of the sequence valve 10. The load in the circuit 120 includes an accumulator 124 that is charged with the flow from the flow source 122 and a subsystem 125. The subsystem 125 may be any hydraulic load such as a single hydraulic valve or a block of several valves that control fluid flow to hydraulic motor(s) of various types in a well know manner. A check valve 126 prevents flow of fluid from the accumulator 124 back to the flow source 122. A return tank 127 returns fluid to the flow source 122.

As further illustrated in FIGS. 2 and 3, the accumulator 124 is in fluid communication with the accumulator port 16 of the sequence valve 10, the output flow from the flow source 122 is in fluid communication with the flow source or input ports 18 and 64 of the sequence valve 10, the tank 127 is in fluid communication with the tank ports 22 and 55 and 56 of the sequence valve 10, and the control signal ports 20 and 60 of the sequence valve 10 provide the pressure signal to control the pressure responsive flow source 122.

FIG. 3 shows the sequence valve 10 in an at rest position at the start of a charging and discharging cycle for the accumulator 124. In this position, the accumulator is at zero gauge pressure and this is also the pressure in the accumulator port 16. The load spring 100 moves the spool 72 and the piston 70 to the right to the positions shown in FIG. 4. In these positions, the orifice 96 of the piston 72 provides restricted flow communication from the port 18 to the control signal port 20 through the passage 94 and chamber 85 and passage 80 and passages 84. The land 83 of the spool 72 blocks communication between the control signal port 20 and the tank port 22.

Figure 4:
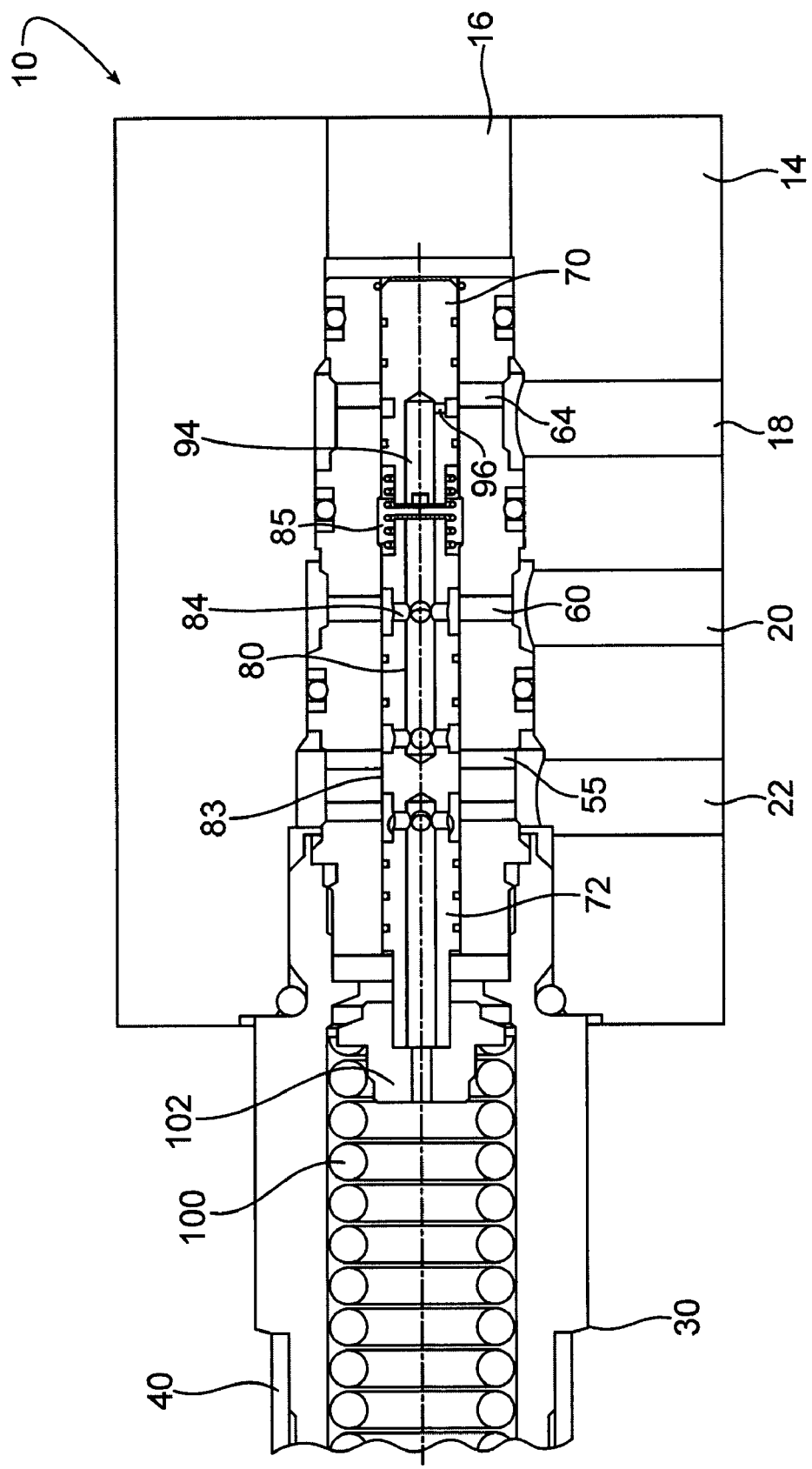
FIG. 4 is a cross sectional side elevation view of a portion of the sequence valve shown in the FIG. 2 circuit, in a second operating position of the sequence valve moving toward a high pressure set point of the sequence valve control signal and of the accumulator as the accumulator is being charged.

Referring now to FIG. 4, when the flow source 122 is actuated to begin to provide fluid flow to the accumulator 124 and to the flow port 18, such fluid flows into the port 18, through the orifice 96, and into the chamber 85 and the control signal port 20. Because the connection from the control signal port 20 to the tank port 22 through the passages 80 and 82 is blocked by the land 83, pressure builds in the chamber 85 and in the control signal port 20. At this point, the pressure in the accumulator port 16 and supply port 18 are slightly higher than the pressure in the passage 94 and chamber 85 and passage 80 and passages 84, due to friction and the pressure drop across the orifice 96. As shown in FIG. 4, the increased pressure in the chamber 85 acts in a direction to move the spool 72 to the left. Since the preload of the spring 100 is relatively heavy, this force of the pressure in the chamber 85 acting against the spool 72 is not enough to move the spool 72 and is not enough for the land 83 to open communication between the control signal port 20 and the tank port 22.

Figure 5:
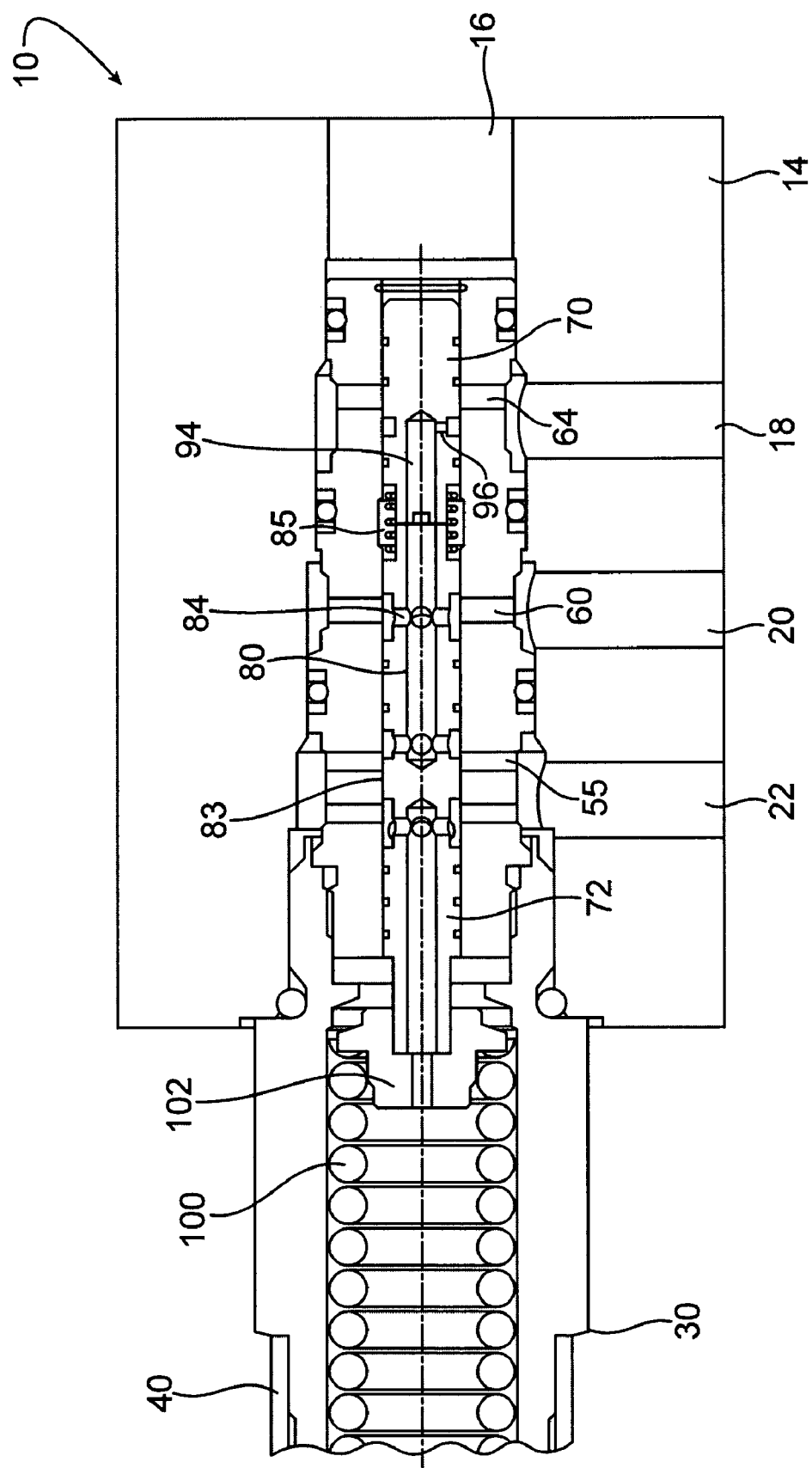
FIG. 5 is a cross sectional side elevation view of a portion of the sequence valve shown in the FIG. 2 circuit, in a third operating position of the sequence valve at a high pressure set point of the accumulator when the accumulator is fully charged.

Referring now to FIG. 5, continued build up of pressure in the accumulator 124 by continued output of the flow source 122 causes a corresponding build up of pressure in the accumulator port 16. Because the accumulator pressure in port 16 is higher than the pressure in the chamber 85, this causes the piston 70 to move to the left toward the position viewed in FIG. 5. This leftward movement of the piston 70 causes the piston 70 to engage the spool 72 and begin to move the spool 72 to the left to open communication between the tank port 22 and the control signal port 20. This decreases the pressure in the chamber 85, and the piston 70 continues to move to the position shown in FIG. 5 against the bias of the spring 100 to block the inlet port 18 and interrupt inlet flow from the port 18 into the passage 94. This also causes the piston 70 to move the spool 72 to the position shown in FIG. 5 and hold the spool 72 in this position to maintain open communication between the control signal port 20 and the drain port 22. This limits and decreases the maximum pressure in the control signal port 20 and reduces such pressure to approach the pressure in the drain port 22. The lowered pressure in the control signal port 20 is communicated to the flow source 122, and this causes the flow source 122 to unload and revert to its lower preset bias pressure. In this manner, the movement of the piston 70 against the preload of the spring 100 establishes the upper pressure set point for the control signal port 20 that is provided to the pressure responsive flow device 122. This upper pressure setting is adjustable by adjusting the biasing force of the spring 100 with the load adjustment screw 104. Also, because the pressure in the control signal port 20 and in the chamber 85 is reduced to pressure in the drain port 22 once the upper pressure setting of the accumulator valve 124 is reached, the sequence valve 10 is latched in its unloading or low control pressure mode to provide a constant low pressure control signal to the flow source 122 until the accumulator 124 again approaches its low pressure setting.

Figure 6:
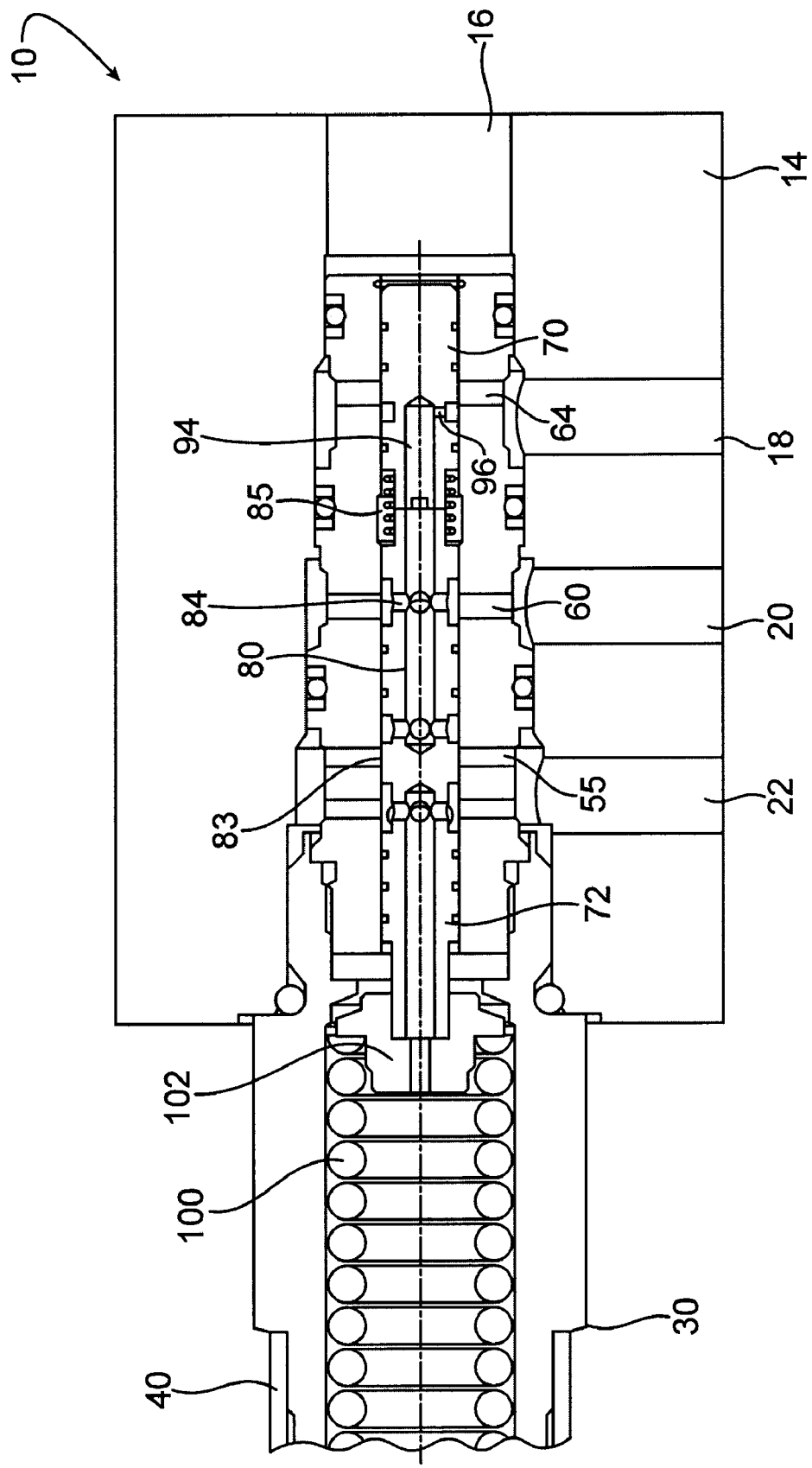
FIG. 6 is a cross sectional side elevation view of a portion of the sequence valve shown in the FIG. 2 circuit, in a fourth operating position of the sequence valve moving away from a high pressure set point of the accumulator as the accumulator is being discharged.

Referring now to FIG. 6, the sequence valve 10 increases the pressure in the control signal port 20 to the flow source to recharge the accumulator 124 when the accumulator pressure decreases toward its low pressure set point. Leakage from the high pressure accumulator port 16 across the piston 70 is prevented by the large overlap resulting from the axial distance between the supply port 64 and the accumulator port 16. This overlap between the exterior surface of the piston 70 and the interior surface of the cage 46 that defines the passage 53 is significantly greater than that found in prior art unloader valves. When the load 125 uses flow from the accumulator 124 and the pressure in the accumulator port 16 deceases, such decreased pressure in the accumulator port 16 causes the spring 100 to move the piston 70 and spool 72 to the right as shown in FIG. 6. This reopens flow port 18 and closes drain port 22 to increase pressure in the control signal port 20. This increased pressure in the control signal port 20 is communicated to the pressure responsive flow source 122 and causes the flow source 122 to increase its output to replenish the accumulator 124 and load 125.

In this manner, the sequence valve 10 controls charging the accumulator 124 between a lower pressure setting and an upper pressure setting. The lower pressure setting is reached when the spring 100 biases the spool 72 and the piston 70 to the position of FIG. 4 to open communication from the supply or flow port 18 through the orifice 96 to the control signal port 22. The higher pressure setting is reached when the spool 72 and the piston 70 move against the spring 100 to the position of FIG. 6 to close such communication).

The sequence valve 10 accordingly provides a hydraulic cartridge valve that functions to keep a hydraulic accumulator 124 charged between two pressure settings by applying a pressure control signal to a pressure responsive flow source that can vary its output according to the control signal. The upper pressure setting and the lower pressure setting are specific to the application requirements and may vary from application to application. The use of the valve 10 in a hydraulic circuit may enhance overall system efficiency and reduce horsepower requirements by freeing the flow source 122 to power other parts of the circuit (not shown in FIG. 2) when recharging of the accumulator 124 is not necessary or, by simply powering down the flow source when the accumulator is fully charged. The valve 10 may also be used in other types of applications that reduce the horsepower requirement once some circuit requirements are satisfied.

Figure 7:
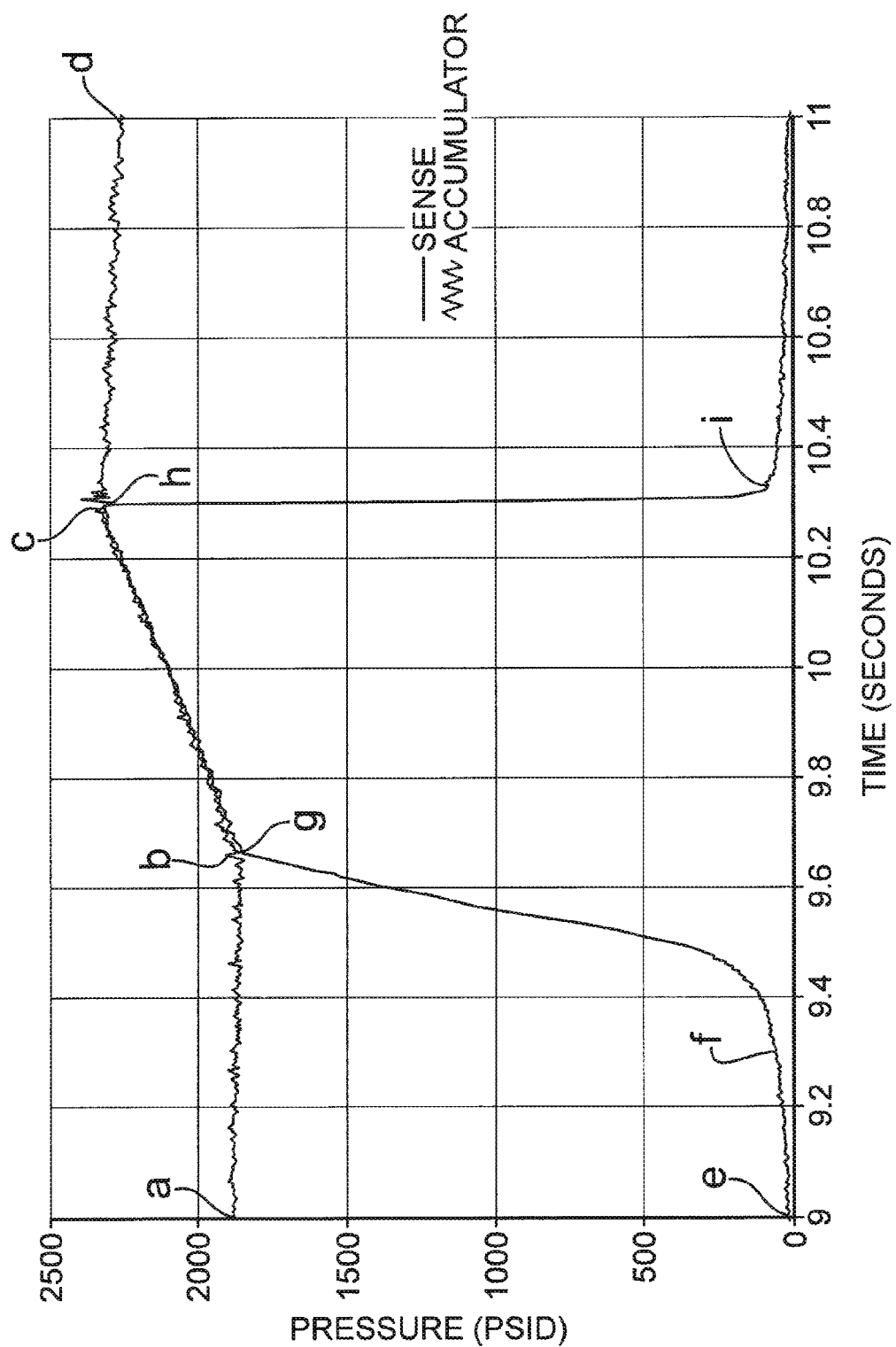
FIG. 7 is a representative pressure graph showing relative pressures of the control pressure and the accumulator pressure in the circuit shown in FIG. 2 during charging and discharging of the accumulator.

FIG. 7 illustrates an exemplary time versus pressure curve for the pressure in the control signal port 20 and for pressure in the accumulator port 16 for the sequence valve 10 and circuit of the present invention. As the accumulator 124 pressure begins to drop from its higher pressure setting toward its lower pressure setting, the pressure responsive flow source 122 and the control signal pressure are in standby modes. In these standby modes, the flow source 122 is unloaded and is operating at its lower pressure bias setting. The pressure of the accumulator 124 is drifting downward as shown in FIG. 7 from point a toward its low pressure set point b. The pressure in the control signal port 20 is near drain port pressure at point e and is beginning to increase at point f as the spool 72 and piston 70 begin to move to the right from the FIG. 5 position toward the FIG. 6 position. As the accumulator 124 nears its low pressure set point b, the rightward movement of the spool 72 and piston 70 closes communication between the control signal port 20 and tank port 22 and opens communication between the flow source port 18 and the control signal port 20. The pressure in the control signal port 20 increases from point f to point g, and in response to this increased control signal pressure the flow source 122 is actuated to provide fluid flow to the accumulator 124. As a result, pump pressure begins to ramp up, along with pressure in flow source port 18 and control port 20. The pressure in accumulator 124 also increases from its low pressure setting b to its high pressure setting c. When the high set pressure at point c is reached for the accumulator, the sequence valve begins to move back toward its position shown in FIG. 5. This causes the pressure in the control signal port 20 to fall from point h to point i approaching drain port pressure. As the load of the circuit shown in FIG. 2 uses fluid power from the accumulator 124, the pressure of the accumulator 124 again decreases from point c to point d until it reaches its lower pressure set point and a recharging cycle is repeated.

Figure 8:
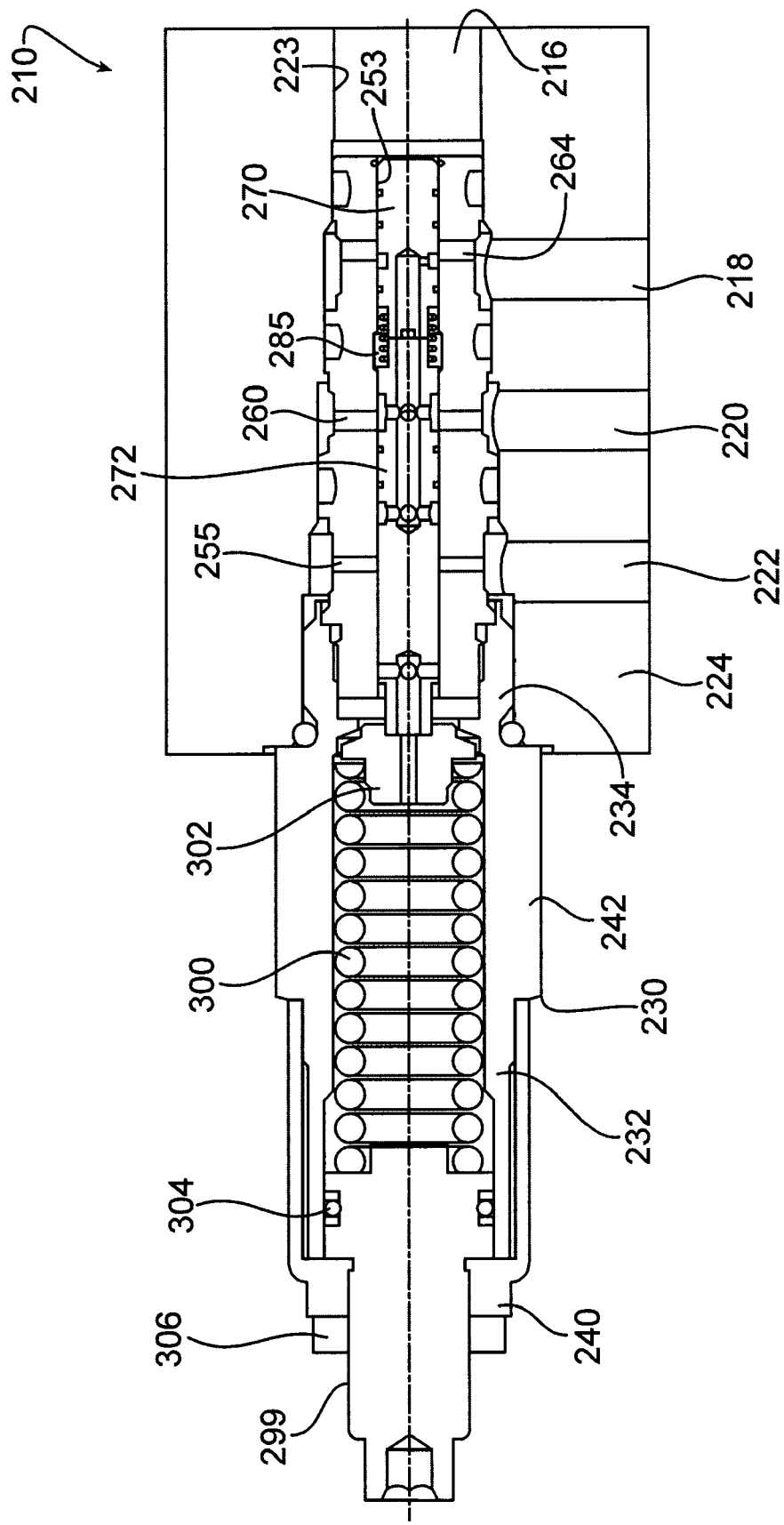
FIG. 8 is an alternative embodiment of a sequence valve according to certain principles of the invention.

An alternative embodiment of the present invention is shown in FIG. 8. The reference numbers used in FIGS. 1-7 above are used in FIG. 8 with the addition of the number 200 for components that are functionally and/or structurally similar. Also, the description above of such structure and of the operation of such components applies to FIG. 8.

Presently preferred embodiments of the invention are shown and described in detail above. The invention is not, however, limited to these specific embodiments. Various changes and modifications can be made to this invention without departing from its teachings, and the scope of this invention is defined by the claims set out below.

What is claimed is:

1. A valve for a hydraulic circuit including an accumulator adapted to operate between a lower pressure setting and an upper pressure setting, the valve being disposed in a cavity block having an accumulator port, a supply port, a control port and a tank port, the valve comprising:
    a cage adapted to be received in the cavity block, the cage having ports in fluid communication with the supply port, the control port and the tank port of the cavity block;
    a spool located within the cage and movable relative to the cage for controlling fluid flow between the control port and the tank port; and
    a piston located within the cage and movable relative to the cage in response to a pressure differential between the accumulator port and the control port, the piston completely blocking the supply port when the pressure in the accumulator reaches the upper pressure setting to prevent fluid flow into the valve from the supply port.

2. The valve of claim 1 wherein a pressure in the control port ramps up as the pressure in the accumulator approaches the lower pressure setting as a result of use of fluid from the accumulator.

3. The valve of claim 1 wherein the valve includes an elongated area of overlapping surfaces of the piston and the cage for preventing fluid leakage from the accumulator port to the supply port.

4. A sequence valve for providing a fluid pressure control signal to a source of fluid flow comprising:
    a supply port for receiving output flow from said source of fluid flow;
    a tank port for returning fluid to said source of fluid flow;
    a load port for receiving a load signal generated by a load powered by said source of fluid flow;
    a control port for communicating said fluid pressure control signal to said source of fluid flow; and
    first and second fluid valves;
    said first fluid valve including cooperating valve surfaces disposed between said supply port and said control port to control fluid communication therebetween;

said second fluid valve including other cooperating valve surfaces disposed between said tank port and said control port to control fluid communication therebetween.

5. A sequence valve as set forth in claim 4, including a spring acting against said second fluid valve.

6. A sequence valve as set forth in claim 5 wherein said spring acts against said first fluid valve, and said spring is arranged to bias said first fluid valve toward an open position and to bias said second fluid valve toward a closed position.

7. A sequence valve as set forth in claim 6, including a piston slidable in a bore;
said piston having a first lateral cross sectional area exposed to fluid pressure in said load port and a second lateral cross sectional area exposed to fluid pressure in said control port;
and said first fluid valve is operated by said piston.

8. A sequence valve as set forth in claim 7, wherein said second fluid valve is operated by said piston.

9. A sequence valve as set forth in claim 4, including a housing having a passage;
said supply port and said tank port and said load port and said control port each communicating with said passage;
a piston slidably disposed in said passage between said supply port and said control port, one of said valve surfaces of said first valve being operated by said piston;
a spool separate from said piston and slidably disposed in said passage between said tank port and said control port, one of said valve surfaces of said second fluid valve being operated by said spool.

10. A sequence valve as set forth in claim 9, wherein said piston has a first lateral cross sectional area exposed to fluid pressure in said load port to move said piston in a direction to close said cooperating valve surfaces of said first valve and a second lateral cross sectional area exposed to fluid pressure in said control port to move said piston in a direction to open said cooperating valve surfaces of said first fluid valve.

11. A sequence valve as set forth in claim 9, wherein said spool has a lateral cross sectional area exposed to fluid pressure in said control port to move said spool in a direction to open said cooperating valve surfaces of said second fluid valve, and a spring acts against said spool to bias said spool in a direction to close said cooperating valve surfaces of said second fluid valve.

12. A sequence valve as set forth in claim 10, wherein said spool has a first lateral cross sectional area exposed to fluid pressure in said tank port and a second lateral cross sectional area exposed to fluid pressure in said control port to move said spool in a direction to open said cooperating valve surfaces of said second valve, said second lateral cross sectional area of said piston being larger than said second lateral cross sectional area of said spool.

13. A sequence valve as set forth in claim 12, including a fluid flow orifice disposed between said supply port and said control port, said orifice restricting fluid flow between said supply port and said control port under all conditions.

14. A sequence valve as set forth in claim 9, including a fluid flow orifice disposed between said supply port and said control port, said orifice restricting fluid flow between said supply port and said control port under all conditions.

15. A valve comprising:
a housing;
a passage in said housing;
a load port and a supply port and a control port and a tank port each communicating with said passage;
a piston movable in said passage and carrying a valve surface that opens and closes fluid communication between said supply port and said control port, said piston having a surface exposed to fluid pressure in said load port and a surface exposed to fluid pressure in said control port;
a spool movable in said passage and carrying a valve surface that opens and closes fluid communication between said tank port and said control port, said spool having a surface exposed to fluid pressure in said control port and a surface engageable by said piston, and
a spring acting against spool and biasing said spool in a direction opposite the direction of force applied by said fluid pressure in said control port acting against said surface of said spool exposed to said fluid pressure in said control port.

16. A valve as set forth in claim 15, wherein the lateral cross sectional area of said surface of said piston exposed to fluid pressure in said control port is greater than the area of said spool exposed to fluid pressure in said control port.

17. A valve as set forth in claim 15, including another spring acting between said piston and said spool and biasing said piston and said spool away from one another.

18. A valve as set forth in claim 15, including an orifice between said supply port and said control port restricting fluid flow therebetween under all conditions.

19. A valve as set forth in claim 15, wherein said housing is a cartridge received in a cavity block.

20. A hydraulic circuit comprising:
a pressure responsive fluid flow source;
a load;
a sequence valve;
said pressure responsive fluid flow source including a fluid flow outlet, a fluid flow inlet, and a pressure responsive device that increases and decreases fluid flow from said outlet;
said load being in fluid communication with said fluid flow outlet;
said sequence valve including:
a load port in fluid communication with said load;
a supply port in fluid communication with said fluid flow outlet,
a tank port in fluid communication with said inlet,
a control port in fluid communication with said pressure responsive device,
a first valve disposed between said supply port and said control port,
a second valve disposed between said tank port and said control port,
said first valve including a valve surface operably connected to a first valve actuator surface, and said first valve actuator surface being in fluid communication with said load port.

21. A hydraulic circuit as set forth in claim 20, wherein said sequence valve includes an orifice disposed between said supply port and said control port.

22. A hydraulic circuit as set forth in claim 21, wherein said orifice is disposed between said valve surface of said first valve and said control port.

23. A hydraulic circuit as set forth in claim 20, wherein said first valve includes another first valve actuator surface in fluid communication with said control port, and said valve surface of said first valve is operably connected to said other valve actuation surface.

24. A hydraulic circuit as set forth in claim 23, wherein said second valve includes a valve surface operably connected to a second valve actuator surface, said second valve actuator surface being in fluid communication with said control port.

25. A hydraulic circuit as set forth in claim 24, wherein said valve surface of said first valve and each of said first valve actuator surfaces are carried on a piston, said valve surface of said second valve and said second valve actuator surface are carried on a spool, and said actuator surfaces of said first and second valves that are in fluid communication with said control port each include an abutment surface, and said abutment surfaces engage one another when the pressure in said load port is at a first predetermined pressure level.

26. A hydraulic circuit as set forth in claim 25, wherein said abutment surfaces are spaced apart from one another when said pressure in said load port is at a second predetermined pressure level, said second predetermined pressure level being less than said first predetermined pressure level.

27. A hydraulic circuit as set forth in claim 26, wherein said load includes an accumulator.

* * * * *